(12) United States Patent
Davies

(10) Patent No.: US 10,554,169 B2
(45) Date of Patent: Feb. 4, 2020

(54) ELECTRONICS HOUSING AND CABLE CLIPS

(71) Applicant: Kevin Stephen Davies, Duncraig (AU)

(72) Inventor: Kevin Stephen Davies, Duncraig (AU)

( * ) Notice: Subject to any disclaimer, the term of this patent is extended or adjusted under 35 U.S.C. 154(b) by 0 days.

(21) Appl. No.: 15/572,745

(22) PCT Filed: May 8, 2016

(86) PCT No.: PCT/AU2016/050344
§ 371 (c)(1),
(2) Date: Nov. 8, 2017

(87) PCT Pub. No.: WO2016/179649
PCT Pub. Date: Nov. 17, 2016

(65) Prior Publication Data
US 2018/0138857 A1    May 17, 2018

(30) Foreign Application Priority Data

May 8, 2015 (AU) ................................ 2015901682
Oct. 5, 2015 (AU) ................................ 2015904137

(51) Int. Cl.
*H02G 3/08* (2006.01)
*H02G 3/32* (2006.01)
*H02S 40/34* (2014.01)

(52) U.S. Cl.
CPC .................................... *H02S 40/34* (2014.12)

(58) Field of Classification Search
CPC ............ H02G 3/08; H02G 3/081; H02G 3/32; H05K 5/00; H05K 5/02; H05K 5/0213; H05K 7/1427; H02S 40/34

USPC ....... 174/17 R, 50, 480, 481, 53, 57, 58, 63, 174/535, 559; 439/535, 536, 949; 248/906; 361/600, 601, 679.01, 724, 752, 361/753, 796
See application file for complete search history.

(56) References Cited

U.S. PATENT DOCUMENTS

| | | | | |
|---|---|---|---|---|
| 5,280,133 A | * | 1/1994 | Nath | H01R 13/5216 |
| | | | | 136/251 |
| 7,053,297 B2 | * | 5/2006 | Hull | H02G 3/081 |
| | | | | 174/50 |
| 7,432,439 B2 | * | 10/2008 | Takada | H01R 9/2425 |
| | | | | 174/50 |

(Continued)

OTHER PUBLICATIONS

Eastern Rail Mounting System 2014—www.easternrail.com—Organizer Basket and Rail Clamp (Year: 2014).*

*Primary Examiner* — Angel R Estrada
(74) *Attorney, Agent, or Firm* — Tope-McKay & Associates

(57) ABSTRACT

A housing (10) comprising a main body including first and second side walls (16, 17) and first and second end walls (18, 19) extending between ends of the first and second side walls (16, 17). A plurality of mounting portions (26) are provided adjacent junction between the side walls (16, 17) and the end walls (18, 19). Bores (28) are provided in each of the mounting portions (26 and slots (36) are provided extending through outer surfaces of the mounting portions (26) into the bore (28). An elongate member of a frame (13) is receivable in the slots (28) of two or more of the mounting portions (26) such that fasteners (34) received in the bores (28) of said mounting portions (26) engage with the elongate member to secure the housing (12) to the frame (13).

14 Claims, 9 Drawing Sheets

(56) References Cited

U.S. PATENT DOCUMENTS

| | | | | |
|---|---|---|---|---|
| 7,918,430 B2 * | 4/2011 | Romerein | ............ | H04M 1/0293 |
| | | | | 248/558 |
| 8,410,359 B2 * | 4/2013 | Richter | .................. | H02G 3/083 |
| | | | | 174/50 |
| 8,471,145 B2 * | 6/2013 | Suzuki | ................. | H05K 5/0226 |
| | | | | 174/50 |
| 8,492,651 B2 * | 7/2013 | Schindler | ................ | H05K 5/063 |
| | | | | 174/50 |
| 8,512,050 B2 * | 8/2013 | McGreevy | .............. | H02S 40/34 |
| | | | | 439/76.1 |
| 8,742,255 B2 * | 6/2014 | Pavlovic | ................ | H05K 9/005 |
| | | | | 174/50 |
| 8,971,046 B2 * | 3/2015 | Solon | ........................ | H02G 3/08 |
| | | | | 174/50 |
| 8,981,218 B1 * | 3/2015 | Kono | .................. | H05K 5/0213 |
| | | | | 174/50 |

* cited by examiner

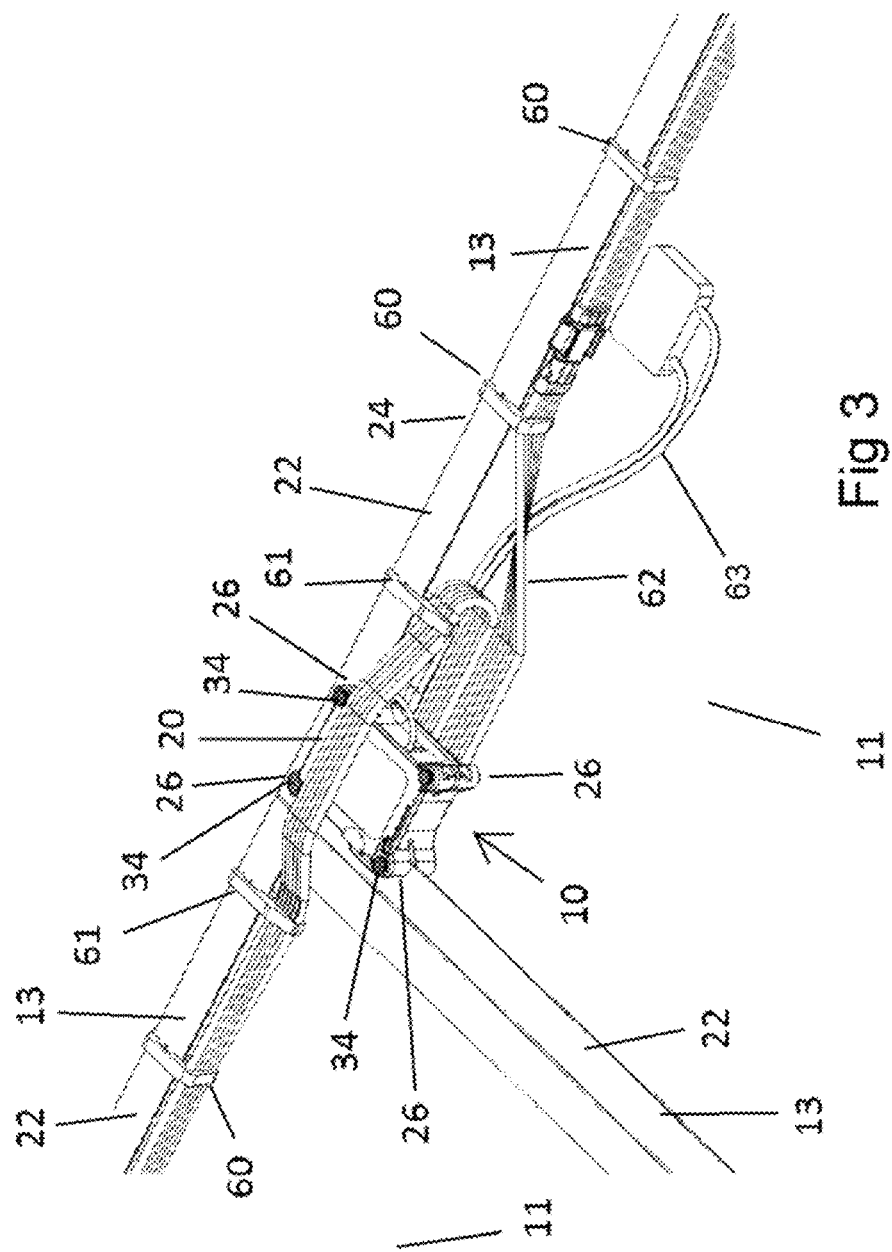

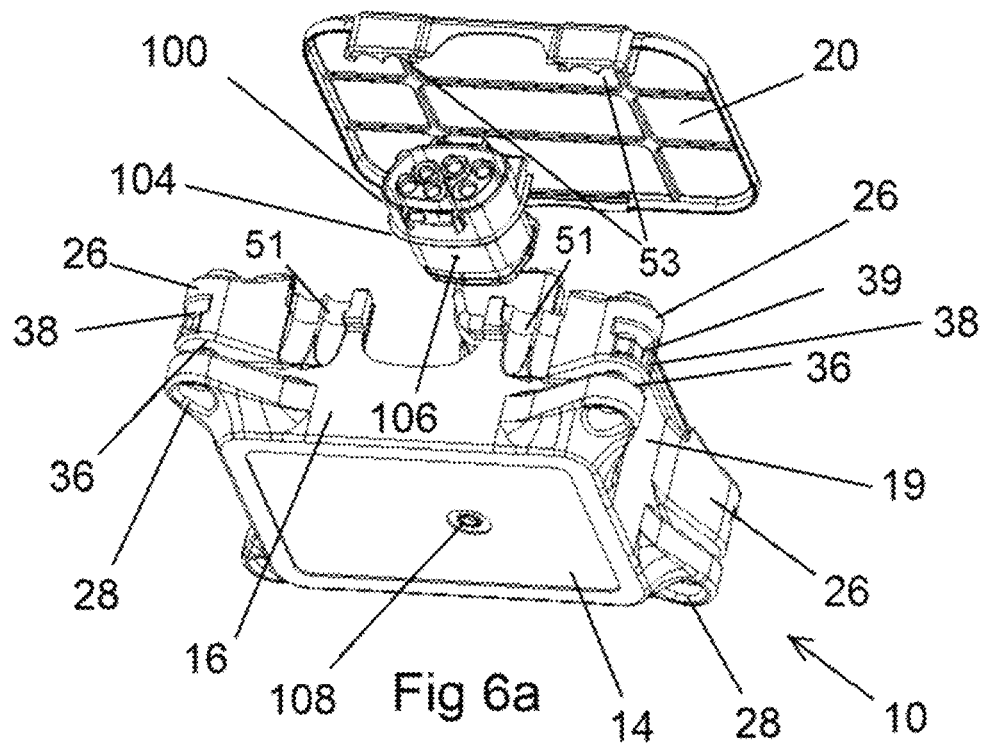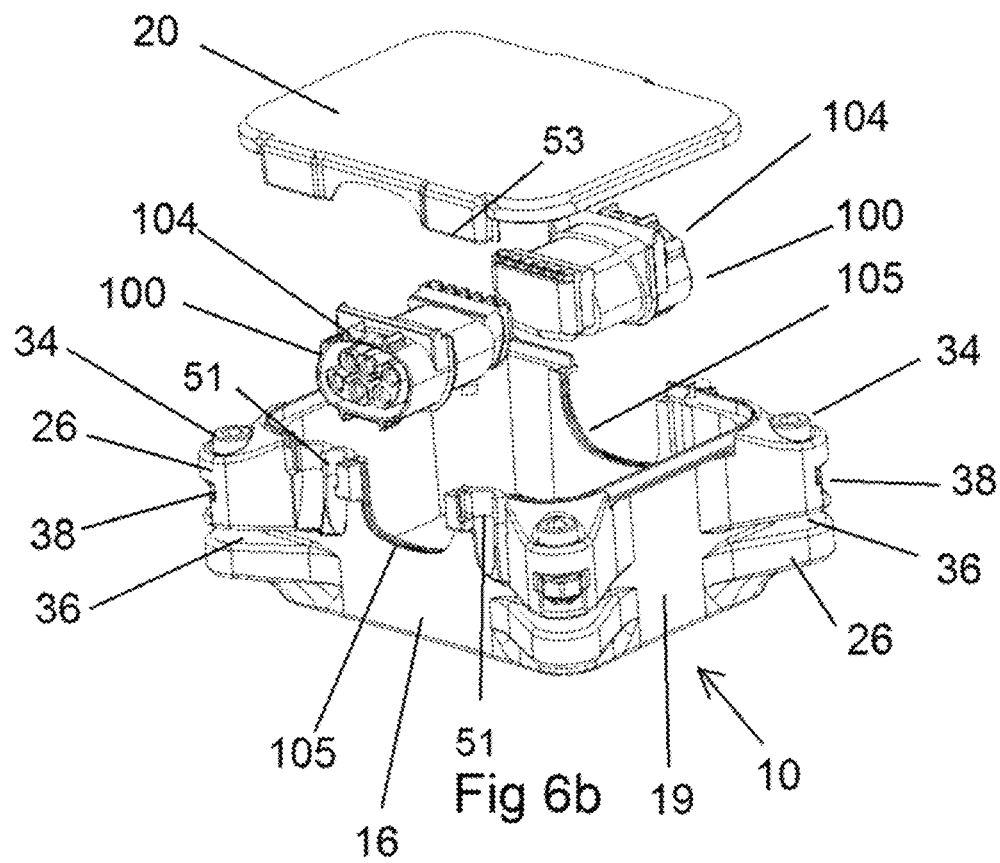

ELECTRONICS HOUSING AND CABLE CLIPS

FIELD OF THE INVENTION

The present invention relates to a housing for electronics used in relation to solar panel systems and associated clips for securing cables exiting the housing.

BACKGROUND TO THE INVENTION

Solar panel systems generally require electronics to be mounted adjacent to the panels. It is common for such electronics to be mounted to the solar panel frame by simple brackets which are screwed to the frame with threaded fasteners. Common mounting systems are metal allowing heat to be easily dissipated but also provide an electrically conductive path for dangerous fault currents to flow through.

The present invention relates to a housing for electronics to be used adjacent a solar panel frame. The housing comprises features aimed at making the housing safe and easy to install in a number of configurations. The housing also includes features provided for connecting earth and earth sensing. Cables extending from the housing may be secured in a number of configurations and cable clips designed for easily and securely connecting the cables to the solar panel frame are provided.

The present invention is expected to be used in particular with a distributed inverter type system. Distributed inverter systems carry the entire current of the loop requiring thicker cables and one or two extra conductors for high speed communications. It is expected that flat cable with multiple cores for active, step, communications and earth would be utilised to meet requirements. The present invention is particularly suitable for providing support to components of such a system.

SUMMARY OF THE INVENTION

According to one aspect of the present invention there is provided housing comprising:
a main body including first and second side walls and first and second end wall extending between ends of the first and second side walls;
a plurality of mounting portions, each mounting portion provided adjacent a junction between one of the side walls and one of the end walls;
a bore provided in each of the mounting portions, the bore being parallel to the adjacent side and end walls; and
a slot provided in each of the mounting portions, the slot extending through an outer surface of the mounting portion into the bore;
wherein an elongate member of a frame is receivable in the slots of two or more of the mounting portions such that fasteners received in the bores of said mounting portions engage with the elongate member to secure the housing to the frame.

Preferably the first and second side walls are parallel to each other and the first and second end walls are parallel to each other and the mounting portions extend outwardly beyond the adjacent side and end walls.

Preferably each of the mounting portions comprises a cylindrical body oriented such that a longitudinal axis thereof is parallel to the connection between the adjacent side and end walls.

Preferably the first and second side walls and the first and second end walls extend perpendicularly from a base wall to define a chamber into which electronic circuitry may be provided.

In a preferred embodiment, each of the first and second side walls and end walls are planar rectangular walls.

Preferably the housing includes a cover securable to edges of the first and second side walls and first and second end walls remote from the base wall.

In one embodiment, the bore through each of the cylindrical bodies extends from a first end thereof, being adjacent the cover to a second end thereof, being adjacent the base wall.

Preferably the slots extend inwardly into the outer surfaces of the cylindrical bodies between the first and second ends thereof such that the slots are perpendicular to the longitudinal axis of the bore.

Preferably the fasteners comprise threaded fasteners and one or more openings are provided in the outer surface of the cylindrical bodies adjacent the slot to receive nuts such that rotation of the threaded fasteners causes them to move longitudinally through the bores to engage with the frame received within the slot.

In one embodiment, the openings are provided on either side of the slots.

In one embodiment, the openings receive connectors for earth and/or earth sense wires such that the connectors are clamped between the nut and the frame.

In one embodiment, holes are provided from the chamber of the housing adjacent the mounting portions directly into the openings and earth connection clips are provided extending through the holes, the earth connection clips including a bendable tab connectable to the circuitry within the housing.

In one embodiment, an elongate cable port is provide for ribbon cable to exit the housing.

In a further embodiment, cable connectors are provided on first and second sides of the housing, the cable connectors being connectable to mating cable connectors provided on ribbon cable.

In accordance with a second aspect of the present invention, there is provided a cable clip comprising resilient first and second arms having first ends connected together by an interconnecting portion to define a first slot for receiving a ribbon cable and resilient third and fourth arms defining a second slot for receiving a portion of a frame of a solar panel wherein flexing apart of the third and fourth, arms causes flexing together of the first and second arms.

Preferably inner surfaces of the first and second arms include corrugations provided to conform with the shape of surfaces of the ribbon cable.

Preferably the third arm is longer than the fourth arm.

Preferably an inner surface of the third arm includes a concave portion located between distal and proximal ends thereof and an inner surface of the fourth arm includes a convex portion adjacent the distal end thereof, wherein the convex portion corresponds to the shape of the concave portion such that the third and fourth define a curved slot portion adjacent a midpoint of the third arm.

Preferably the inner surface of the third arm includes also a notch adjacent the distal end thereof located at a point past the distal end of the fourth arm.

In one embodiment, the third arm extends outwardly from the second arm adjacent the first end thereof such that the first arm is generally perpendicular to the first and second arms and the fourth arm extends outwardly from the second arm from a location offset towards a second end thereof.

In one embodiment, the fourth arm includes also a recess adjacent the proximal end thereof extending into the fourth arm from the inner end of the second slot in a direction generally parallel to the first slot.

In a further embodiment, the third and fourth arms extend from the interconnecting portion parallel to the first and second arms.

In a further embodiment, a fifth arm is provided including a first portion extending transversely to the distal end of the fourth arm away from the third arm and a second portion extending transversely to the first portion parallel to the fourth arm such that the fourth arm and the fifth arm define a third slot.

Preferably a distal end of the fifth arm includes a foot portion extending parallel to the first arm such an inner surface thereof is collinear with an inner surface of the second arm, thereby defining the first slot.

In a further embodiment, a fifth arm is provided including a first portion extending transversely to the distal end of the fourth arm away from the third arm, a second portion extending transversely to the first portion parallel to the second and fourth arms such that a third slot is defined between the second and fourth arms and the fifth arm.

Preferably the fifth arm includes a third portion extending from the end of the second portion, the third portion curving back towards the first arm such that the third slot includes a curved neck portion defined by the third portion and the distal end of the second arm.

Preferably a distal end of the fifth arm includes a foot portion extending parallel to the first arm such an inner surface thereof is collinear with an inner surface of the second arm, thereby defining the first slot.

BRIEF DESCRIPTION OF THE DRAWINGS

The invention will now be described, by way of example, with reference to the following drawings, in which:

FIG. 1b is an upper perspective view of the housing of FIG. 1a;

FIG. 3 is a view of the housing of FIG. 1 and the cable clips secured to solar panels;

FIG. 6a is a lower exploded view of a second embodiment of a housing in accordance with the present invention;

FIG. 6b is an upper exploded view of the housing of FIG. 6b;

DETAILED DESCRIPTION OF PREFERRED EMBODIMENTS

Figure 4:
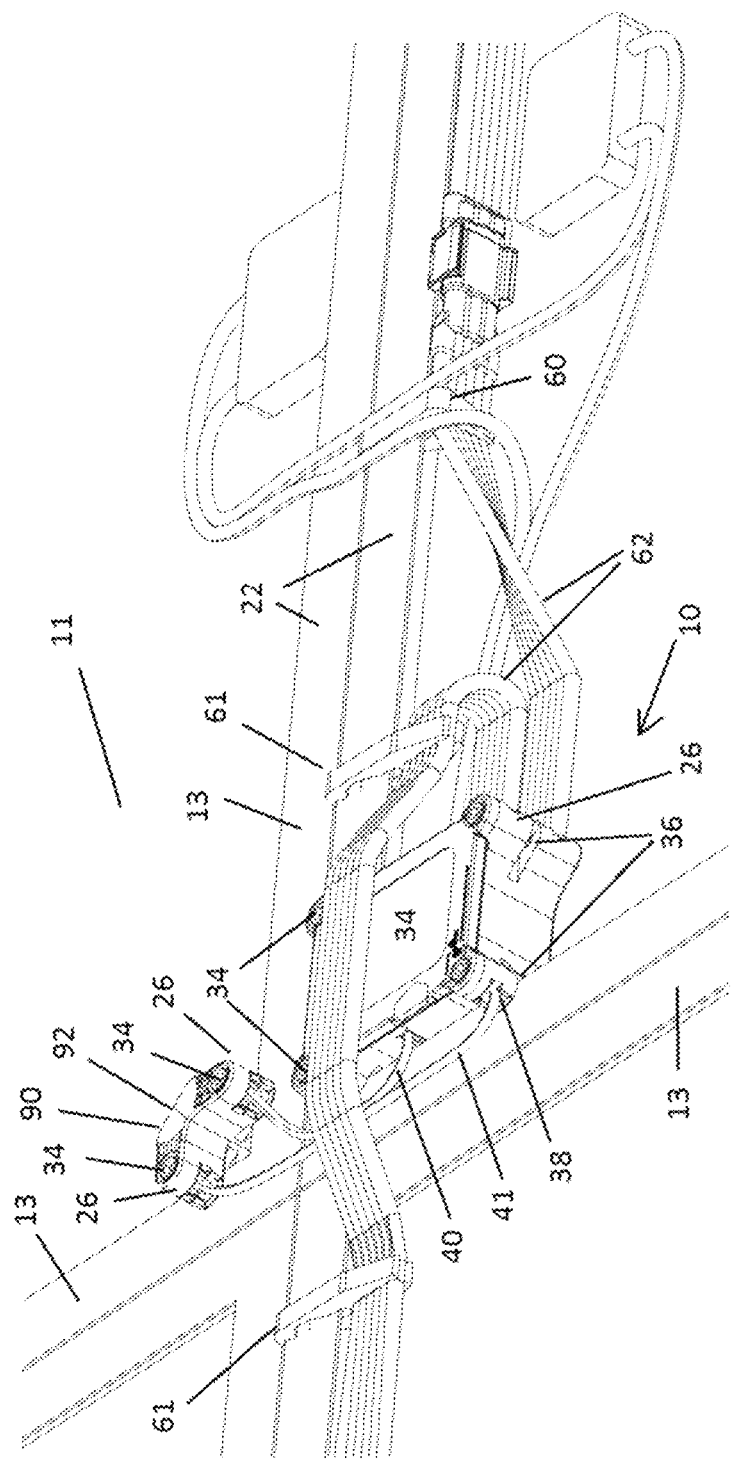
FIG. 4 is a further view showing the housing and cable clips connected to solar panels and extending earth and earth sense to a second panel.
Figure 5:
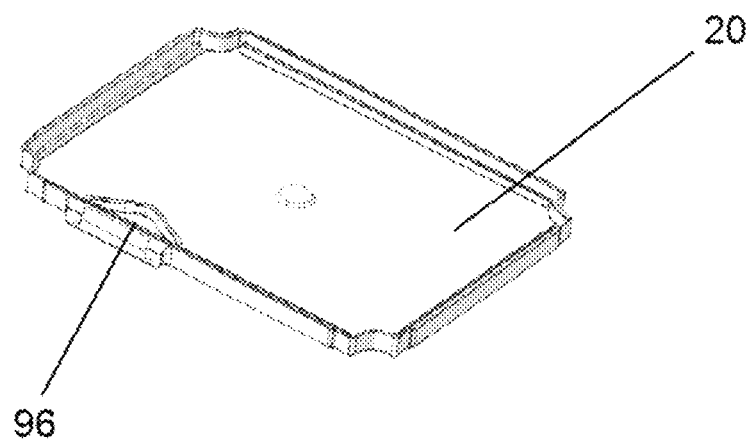
FIG. 5 is a view of the cover of the housing of FIG. 1.

Referring to the Figures, there is shown a housing 10 for receiving electronic circuitry. The housing 10 is provided to be secured to a frame 13 (as shown in FIGS. 3, 4 and 8) of a solar panel 11 such that electronics provided within the housing 10 may be connected to the solar panel 11 to control operation of the solar panel system.

The housing 10 comprises an outer all 12 extending perpendicularly from a base wall 14 to define a chamber into which electronic circuitry may be provided. The outer wall 12 comprises first and second side walls 16 and 17 and first and second end walls 18 and 19. In the embodiment shown, each of the first and second side walls 16 and 17 and end walls 18 and 19 are planar rectangular walls. The first and second side walls 16 and 17 are parallel to each other. The first and second end walls 18 and 19 join between ends of the first and second side walls 16 and 17 and are perpendicular to the first and second side walls 6 and 1 such that the defined chaser comprises a rectangular prism.

The housing 10 includes a cover 20 provided to enclose the chamber. The cover 20 comprises a rectangular planar member securable to edges of the first and second side walls 16 and 17 and first and second end walls 18 and 19 remote from the base wall 14. The cover 20 may be secured to the housing 10 by appropriate glue, sealer resin or seal and fasteners to provide a sealed chamber in which the electronic circuitry is provided.

The housing 12 is provided to locate the electronic circuitry adjacent the solar panel 11. The frame 13 of the solar panel 11 comprises elongate members formed into a rectangular frame. The elongate members comprise extrusions having a rear wall portion 22 and an edge wall portion 24. Both of the rear and edge wall portions 22 and 24 comprises an elongate planar sections. The edge wall portion 24 is perpendicular to the plane of the solar panel 11 extending around the periphery thereof. The rear wall portion 22 extends perpendicularly to the edge wall portion 28 from a side thereof remote from a front surface of the solar panel 11. The edge wall portion 22 therefore lies in a plane parallel to the solar panel 11 behind the solar panel 11.

The housing 10 is provided with a plurality of mounting portions 26. The mounting portions 26 allow attachment to the frame 13 and are provided adjacent the connection between each of the side walls 16 and 17 and the end walls 18 and 19. There are therefore four mounting portions 26 provided in the embodiment shown. It will be appreciated though that other numbers of mounting portions 26 may be provided, depending on requirements. Each of the mounting portions 26 in the embodiments shown are located to extend outwardly beyond the plane of both of the adjacent side and end walls 16 or 17 and 18 or 19.

The mounting portions 26 in the embodiment shown each comprise a cylindrical body 27. The cylindrical bodies 27 are oriented such that a longitudinal axis thereof is parallel to the connection between the adjacent side and end walls 16 or 17 and 18 or 19. That is, the longitudinal axis of the cylindrical body 27 is parallel to both of the adjacent side and end walls 16 or 17 and 18 or 19 and perpendicular to the base wall 14.

Figure 1A:
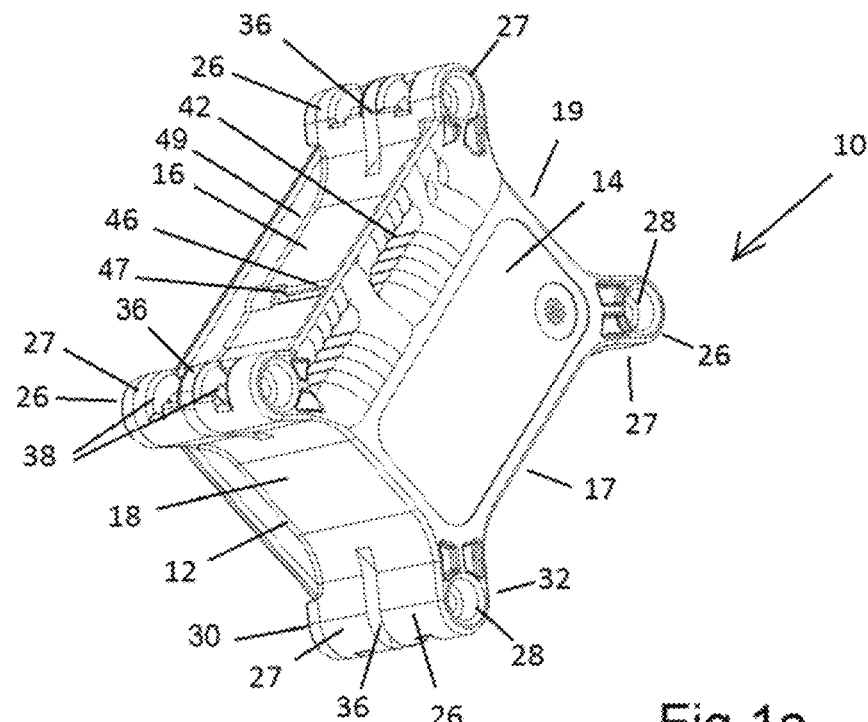
FIG. 1a is a lower perspective view of a housing in accordance with the present invention.
Figure 1B:
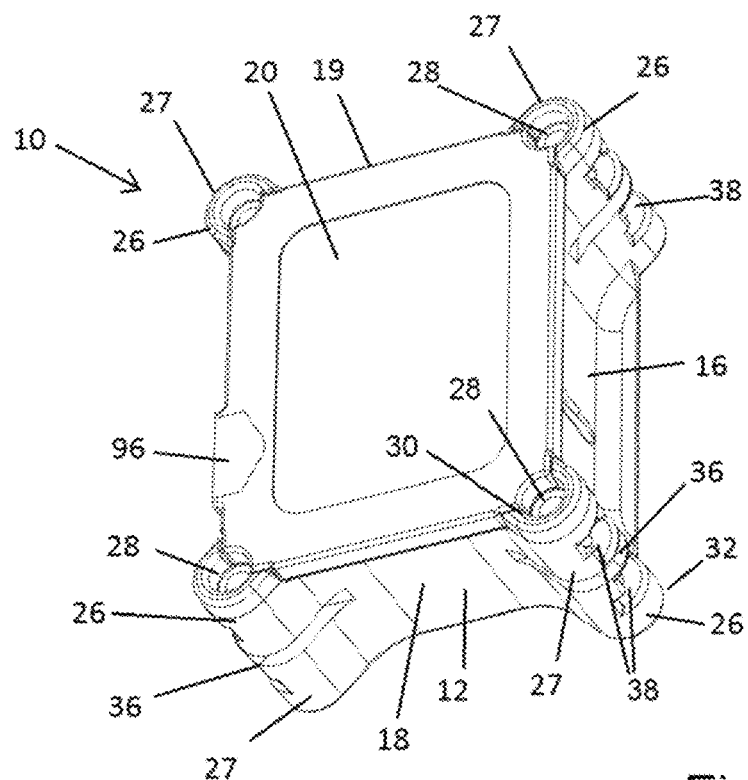

The mounting portions 26 each include a bore 28 extending through the cylindrical body 27. The bores 28 in the embodiment of FIG. 1 extend parallel to the longitudinal axis of the cylindrical body 27 from a first end 30 thereof, being adjacent the cover 20 to a second end 32 thereof, being adjacent the base wall 14. The bores 28 are provided for receiving fasteners 34.

The mounting portions 26 each include a slot 36 therein. The slots 36 are provided in an outer surface of the cylindrical body 26 between the first and second ends 30 and 32 thereof. The slots 36 extend inwardly into the outer surface such that the slots 36 are perpendicular to the bore 28. That is, the slots 36 extend parallel to the base wall 14 of the housing 10.

The slots 36 are provided such that the rear wall portions 22 of the frame 13 are receivable in the slots 36. When received in the slots 36, the rear wall portions 22 of the frame 13 pass into the bores 28 of the cylindrical bodies 27.

The fasteners 34 are inserted into the first or second ends 30 or 32 of the bores 28 of the mounting portions 26 such that ends thereof can engage with the rear wall portion 22 of the frame 13. The fasteners 32 in the embodiment shown comprise threaded fasteners. Openings 38 are provided in the outer surface of the cylindrical bodies 27 either side of the slot 36 for receiving nuts 39. The internal shape of the openings 38 is such that the nuts 39 are captured within the openings 38 and prevented from rotation. The threaded fasteners 34 therefore engage with the nuts 39 such that rotation of the threaded fasteners 34 causes them to move longitudinally through the bores 28. Ends of the fasteners 34 thereby engage against the surface of the rear wall portions 22 of the frame 13 to clamp the rear wall portions 22 within the slots 36. In this embodiment, Nylock style nuts are used to ensure the fasteners do not self-loosen. Thread-lock paste could otherwise be used.

The cover 20 of the housing 10 is provided with a window 96 under which an indicator light is provided. The indicator light may comprise an LED on the circuit board provided within the housing to provide lights for diagnostic purposes. The indicator light is provided in a light recess 96 provided on an inner surface of the cover 20.

A flange 49 is provided to mate with the cover 20. The flange and cover 20 extend beyond the extents of the walls 16, 17, 18 and 19 and contain a printed circuit board (PCB). The flange extends beyond components of the PCB that are contained within the rectangular prism formed by walls 16, 17, 18, 19.

Earth and earth sense wires (not shown) extend from the PCB through apertures 47 of the side walls 16 and 17. The wires are terminated at the remote end into a fork crimp lug. Earth and earth sense wires are interchangeable and may be connected in any order so long as a wired loop is created between the wires attach to the PCB through apertures 47.

In this embodiment, star washers are provided at the base of the Nylock nuts 39 and space for the fork crimp lugs to be inserted is provided by opening 38. The wire with crimp lugs are pre-fitted to the openings 38 most commonly used for installation but provision is also made so that installers are able to easily move the wires to other openings 38 as necessary to provide correct earth and earth sensing. Electrical connection to a frame 13 is improved by the included star washer and occurs when the associated fastener 34 is tightened.

For earth connection of a secondary solar panel 11, an earth connector 90 may also be provided such that earth (or earth sense) wires 40 and 41 may be connected to the frame of the panel 11 adjacent the panel 11 to which the housing 12 is connected. The earth connector comprises a body portion 92 on which a pair of mounting portions 26 are provided. The mounting portions 26 are of the same configuration as the mounting portions 26 on the housing 10. The mounting portions 26 extend from adjacent perpendicular sides of the body portion 92 such that mounting portions 26 can be secured to the frame 13 adjacent a corner as shown in FIG. 4.

The wire 40 would typically be connected to one of the openings 38 but may be removed from opening 38 and routed by an installer to earth connector 90. The installer then routes wire 41 to an appropriate opening 38 to complete the circuit back to the frame of the panel 11 to which the housing 12 is connected.

It does not matter whether wire 40 from the PCB is earth or earth sense as a completed loop is always present through the frame of the solar panel 13. Loss of earth or earth sense connection on either frame 13 will be sensed by the earth sense wire causing an associated inverter system to be shut down to a safe state.

In use, the housing 10 may be engaged with the rear wall portion 22 of the frame 13 by receiving the distal edge of the rear wall portion 22 into the slots 36 of two or more of the mounting portions 26. The housing 10 may be arranged adjacent a corner of the frame 13 (as shown in FIGS. 3 and 4) such that the rear wall portions 22 are received in the slots 36 of three of the mounting portions 26. Alternatively, the housing 10 may be located away from the corners such that the rear wall portion 22 is received only in the slots 36 of two of the mounting portions 26. The fasteners 34 are rotated to move towards the frame 13 and the ends of the fasteners engage with the frame 13, thereby securing the housing 12 relative to the frame by clamping the rear wall portion 22 thereof within the slots 36.

The electronics within the housing 10 are to be sealed within the housing 10 to prevent ingress of moisture. The sealing is provided by resin injected into the housing 10 to seal around the electronics. A transparent silicon is first placed within the lighting recess 96 to a depth such that when the circuit board is received in the housing 10, the LED forming the indicator light touches the silicon. The cover 10 is then partially filled with resin allowing the circuit board placed within the cover 20. The body of the housing 10 containing the circuit board is then connected to the cover 20 and the resin allowed to set.

Further silicon resin is then injected into an opening provided in the base wall 14 of the housing 14 to further seal around the circuit board. Silicon resin has the advantage of allowing hydrogen to escape from electrolytic capacitors, given silicon resin is particularly permeable to hydrogen. A sealing membrane is then placed over the hole through which the silicon is injected. The sealing membrane comprises a waterproof, air permeable material, such as material sold under the brand Gortex, to allow airflow but restrict entry of moisture.

The side and end walls 16, 17, 18 and 19 are provided also with channels 46 therein. The channels 46 extend from adjacent the base wall 14 to adjacent the cover 20. The channels 46 are provided to receive the earth and earth sense wires 40 and 41 such that the earth and earth sense wires 40 and 41 can extend from below the rear wall portion 22 of the frame 13 to above for connection.

The wires exiting the housing 10 include an earth sense wire. Each of these wires is provided with a connector receivable in one of the openings 38. The connectors may include holes such that the connectors may receive the fasteners 34 (or be a fork lug as described earlier) to be clamped by the nut between the star washer and the housing 10. The earth wire therefore provides earth by connection to the frame 13 and the earth sense wire provides sensing to determine whether adequate earthing has been lost.

The circuit board filters and detects the voltage on the earth sense wire and shuts down the inverter system if a sufficient difference in voltage is detected between the earth and earth sense wires. The circuit of this embodiment is part of a Distributed Inverter System and must cope with the circuit being at high voltages relative to earth. For this system the difference voltage that causes a shutdown must be low enough be safe but high enough to prevent false triggering from noise and measurement errors in the system. Typically, a measured difference of 10V to 40V is permitted.

Figure 2A:
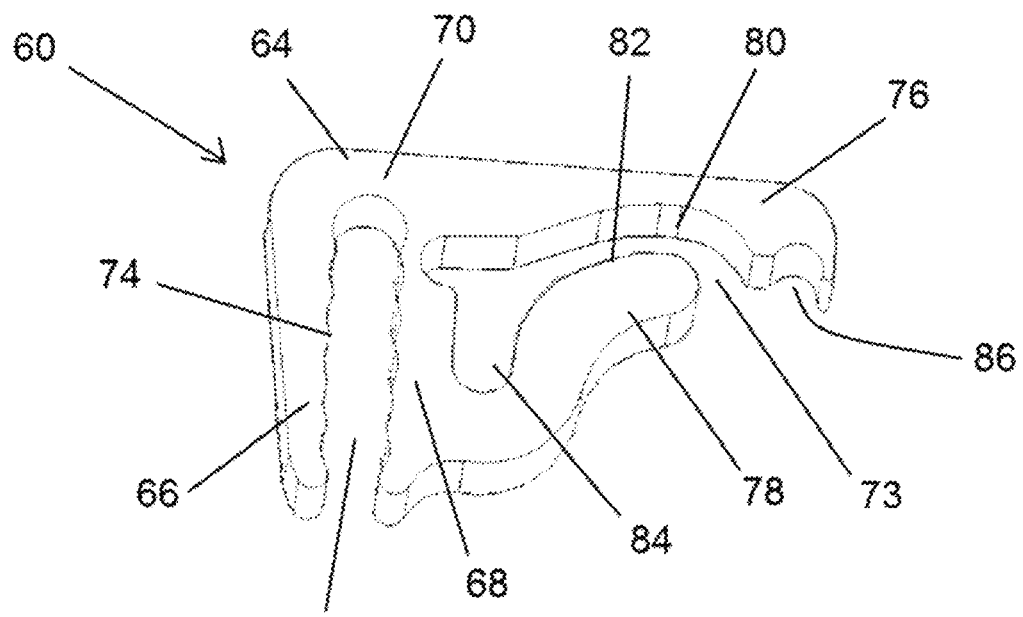
FIG. 2a is a view of a first embodiment of a cable clip in accordance with the second aspect of the present invention.

There is also provided one or more cable clips provided for use with the housing 10. FIG. 2a shows a first embodiment of a cable, clip 60. Cable exiting the housing 10 includes a ribbon cable 62 which requires securing to the frame 13 of the solar, panel 11. The housing 10 in the embodiment of FIG. 1 includes an elongate cable port 42 in the base wall 14 from which the ribbon cable 62 exits. The cable clip 60 is provided for securing the ribbon cable 62 in place.

The cable clip 60 comprises a body 64 formed of a suitable flexible resilient material, such as a suitable plastic. The body 64 includes generally Li-shaped portion formed of a first arm 66 and a second arm 68 connected at first ends thereof by an interconnecting portion 70. The first, and second arms 66 and 68 extend parallel to each other, thereby defining a first slot 72 provided for receiving the ribbon cable 62. Inner surfaces of the first and second arms 66 and 68 include corrugations 74 provided to conform with the shape of the surfaces of the ribbon cable 62. The ribbon cable 62 is received within the first slot 72 by flexing apart of the arms 66 and 68. The arms 66 and 68 flex back together to engage with and hold the ribbon cable 22.

The cable clip 60 includes also a frame engaging portion. The frame engaging portion comprises third and fourth arms 76 and 78 extending outwardly from the second arm 68 on a side thereof opposite to the first arm 66 to define a second slot 73. The third arm 76 extends outwardly from the second arm 68 adjacent the first end thereof such that the first arm is generally perpendicular to the first and second arms 66 and 68. The fourth arm 78 extends outwardly from the second arm 68 from a location offset towards the second end thereof.

The third arm 76 is longer than the fourth arm 78 such that a distal end of the third arm 76 is located further from the second arm 68 than a distal end of the fourth arm 78. An inner surface of the third arm 76 includes a concave portion 80 located between distal and proximal ends thereof. An inner surface of the fourth arm 78 includes a convex portion 82 adjacent the distal end thereof. The convex portion 82 corresponds to the shape of the concave portion 80 such that the third and fourth arms 76 and 78 define a curved slot portion adjacent a midpoint of the third arm 76.

The fourth arm 78 includes also a recess 84 adjacent the proximal end thereof. The recess 84 extends into the fourth arm 78 from the inner end of the second slot 73 in a direction generally parallel to the first slot 72, away from the third arm 76.

The inner surface of the third arm 76 includes also a notch 86 adjacent the distal end thereof. The notch 86 is located at a point past the distal end of the fourth arm 78.

In use, the ribbon cable 62 is received in the first slot 72 by flexing apart the first and second arms 66 and 68. The rear wall portion 22 of the frame 13 is then received in the second slot 73. The shape of the slot flexes apart the third and fourth arms 76 and 78 as the cable dip 60 is slid over the rear wall portion 22. The junction between the rear wall portion 22 and the edge wall portion 24 is received in the notch 86 and a lip portion provided on the distal edge of the rear wall portion 22 is received in the recess 84. The ribbon cable 62 may therefore be located adjacent the frame 13 to be connected to further components of the solar panel system.

Due to the arrangement of the cable clip 60, when the third and fourth arms 76 and 78 flex apart, the first and second arms 66 and 68 move towards each other. Therefore, when the rear wall portion 22 of the frame 13 is received in the second slot 73, the first and second arms 66 and 68 clamp more tightly against the ribbon cable 62. The ribbon cable 62 is therefore held solidly by the cable clip 60 once connected to the frame 13.

Figure 2B:
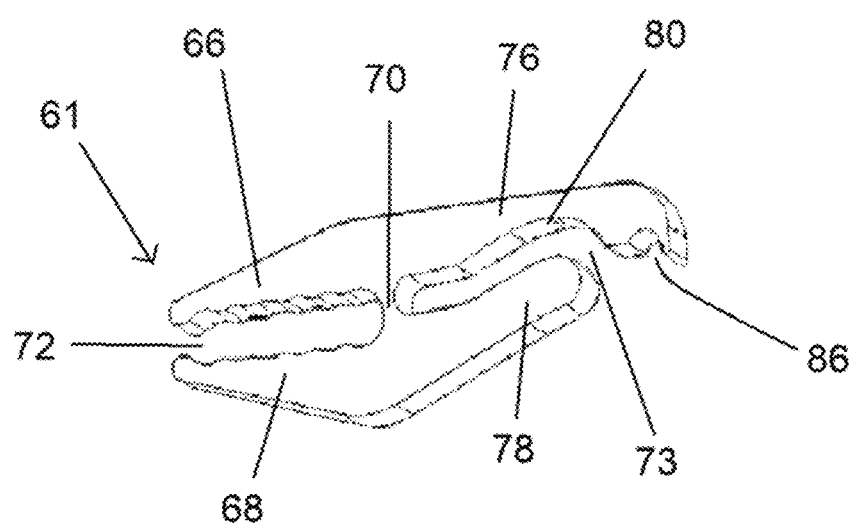
FIG. 2b is a view of a second embodiment of a cable clip in accordance with the second aspect of the present invention.

FIG. 2b shows an alternative embodiment of a cable clip 61. The cable clip 61 of FIG. 2b is similar to the cable clip 60 of FIG. 2a and like reference numerals are used to denote like parts.

The cable clip 61 includes third and fourth arms 76 and 78 defining the second slot 73, however the third and fourth arms 76 and extend from the interconnecting portion 70 parallel to the first and second arms 66 and 68. The second slot 73 is therefore parallel to and generally collinear with the first slot 72. The cable clip 61 may therefore be used to hold the ribbon cable 62 such that it is parallel to the rear portion 22 of the frame 13, rather than the perpendicular configuration of the cable clip 60. The cable dips 60 and 61 may therefore be used to secure the cable 62 such that rotates between various perpendicular configurations, as can be seen in FIGS. 3 and 4.

Figure 7:
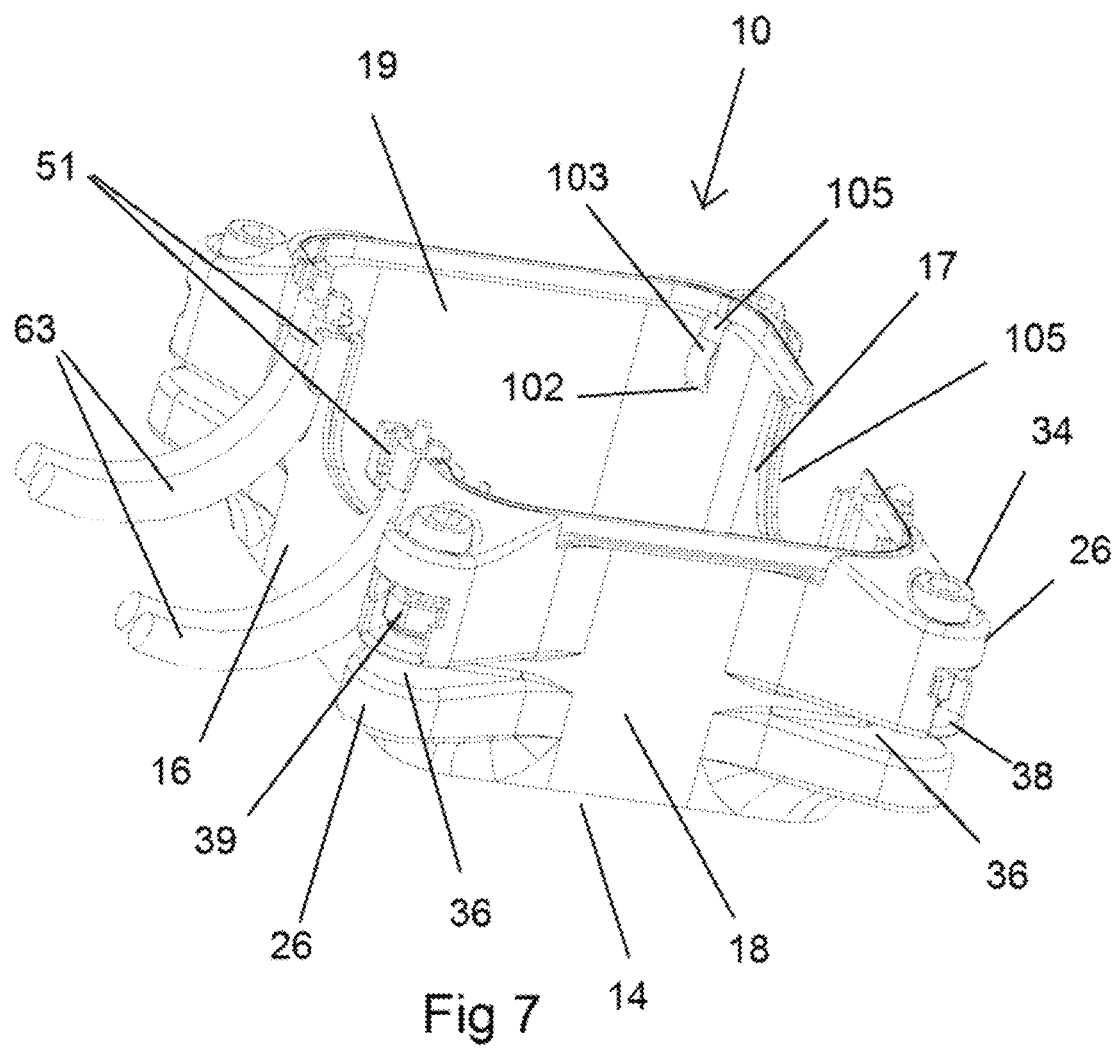
FIG. 7 is an upper view of the housing of FIG. 7 with the cover removed.

FIGS. 6 and 7 show a second embodiment of a housing 10 in accordance with the present invention. The housing 10 of FIGS. 6 and 7 is similar to the first embodiment and like reference numerals are used to denote like parts.

The housing 10 includes mounting portions 26 as in the first embodiment for mounting to the frame 13, however the openings 38 are provided only on one side of the slot 36, being the side adjacent the cover 20. The housing 10 is therefore provided for mounting only with the base wall 14 adjacent the solar panel 11. The bores 28 in this embodiment extend only from the first end 30 of the mounting portions 26 to the slot 36.

The shape of the slot 36 in the embodiment of FIGS. 6 and 7 is tapered such that the slot 36 is narrower adjacent an outer side thereof remote from the housing 10. Sections of the mounting portion 26 either side of the slot 36 will then flatten against the frame 13 on tightening of the fastener 34. In this embodiment, the base of the slot 36 where it meets the housing 10 contains a 1 mm radius forming a flattened bottom 'U' when viewed side on. The radius corner spreads the stress preventing cracking as the slot 36 flattens against the frame 13. It is desirable to have a radius of at least 0.1 mm to prevent such cracking.

The cable ports 42 are replaced with cable connectors 100 which are connectable to mating cable connectors 101 provided on the cable 62. The cable connectors 100 are provided on both the first and second side walls 16 and 17. The cable connectors comprise connector units 104 which are received in recesses 105 in upper edges of the first and second side walls 16 and 17 such that inner ends thereof are located within the chamber of the housing 10 and outer ends extend externally of the housing 10. The connector units 104 are sealed around the edges thereof, preferably with silicon or resin.

For this embodiment, the solar wires 63 are clamped between the base 20 and housing 10. To ensure the solar wires 63 are held securely, there are provided recesses 51 in the housing 10 adjacent the upper end of the side wall 16 and recessed protrusions 53 provided in the cover 20. The recessed protrusions 53 and recesses 51 slide into each other as the housing 10 is fitted to the cover 20 prior to topping up with resin. Rigid holes are formed from recesses 51 with and the recessed protrusions 53 to accept the solar wires 63. The resin fills any remaining gaps between the holes formed from recesses 51 and solar wires 63 providing further rigidity and sealing the wires to the enclosure to prevent moisture ingress.

The connector units 104 are provided with a breather hole 106 located on a portion thereof inside the chamber of the housing 10. The breather hole 104 allows airflow from within the connector unit 104 to the chamber of the housing 10. A further breather hole 108 is provided in the base wall 14 of the housing 10. The further breather hole 108 is covered with an air permeable membrane such as material sold under the brand Gortex. The further breather hole 108 therefore prevents entry of moisture. The use of the breather holes 106 and 108 prevent changes in pressure drawing moisture in through the cable connectors 100.

Figure 8A:
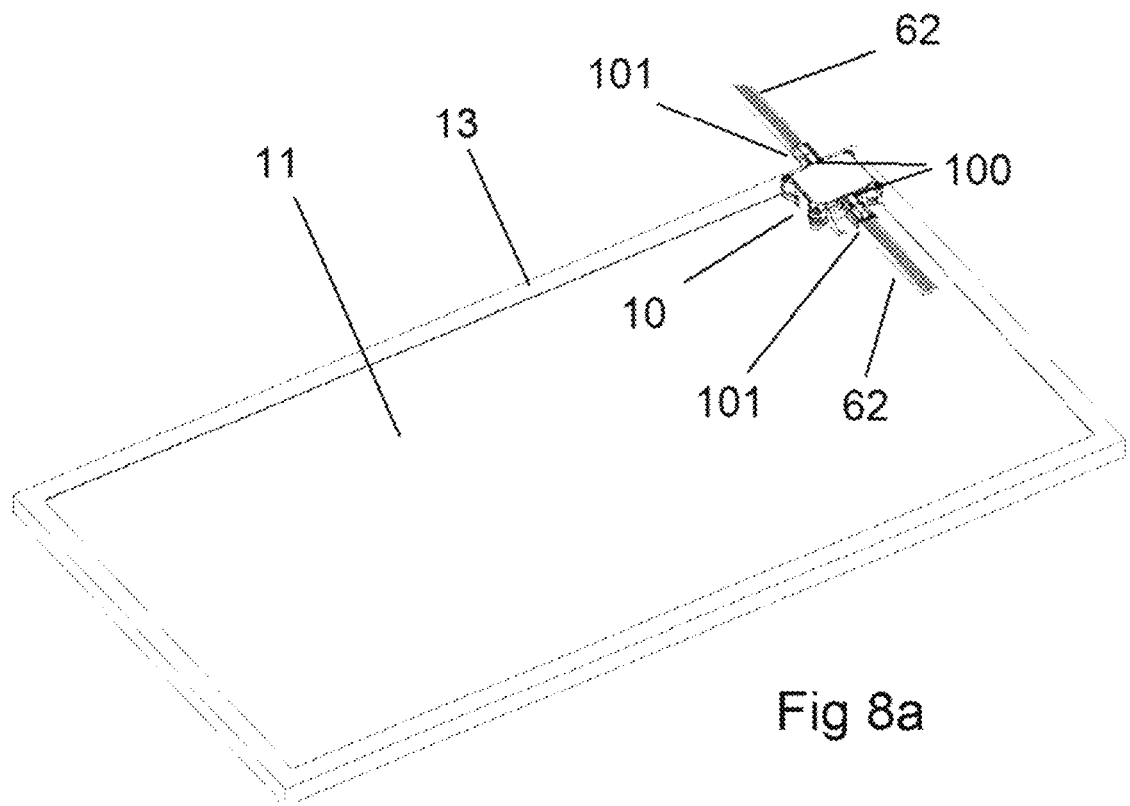
FIG. 8a is a view of the housing of FIG. 6 secured on a solar panel in a first orientation.
Figure 8B:
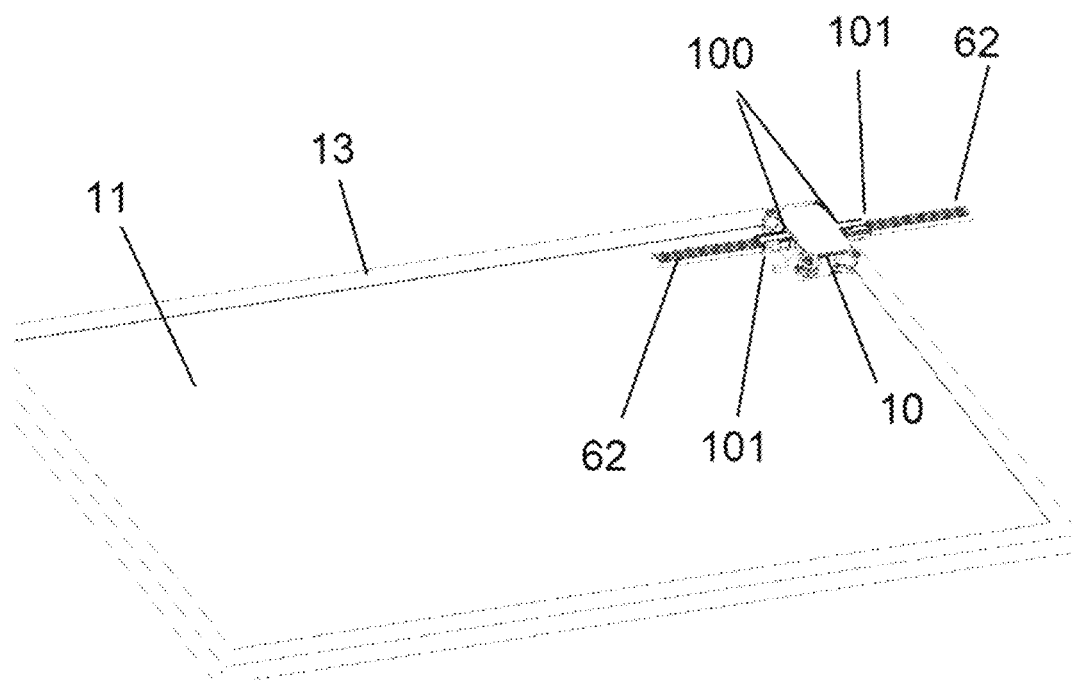
FIG. 8b is a view of the housing of FIG. 6 secured on a solar panel in a second orientation.

The earth and earth sense connections from the circuitry within the housing 10 are also connected in this embodiment to the fastener 34 within the opening 38. However, holes 102 are provided from the chamber of the housing 10 adjacent the mounting portions 26 directly into the openings 38. Earth connection clips 103 connect to the fasteners 34 and extend through the holes 102 to the interior of the chamber. The earth connection clips 103 include an aperture to receive the fastener 34 and a tab 105 extending through the hole 102. The tab 105 may be bent for direct connection to the circuit board. In this embodiment, four tabs are provided, one in each corner. That is, two earth in the corners opposite the solar wires 63 and two earth sense connections adjacent the solar wires 63. The two earth tabs 105 opposite the solar wires provide a safer redundant connection. The two earth sense tabs 105 adjacent the solar wires 63 ensure an earth sense connection is available to the circuitry regardless of whether the connection arrangement is as shown in FIG. 8a or FIG. 8b. In both arrangements FIGS. 8a and 8b, one earth sense connected to corner slot 36 is not connected to a frame 13. This unconnected earth sense point may be connected to an earth connector 90 of an adjacent solar panel by an installer running a wire between the two.

Figure 9A:
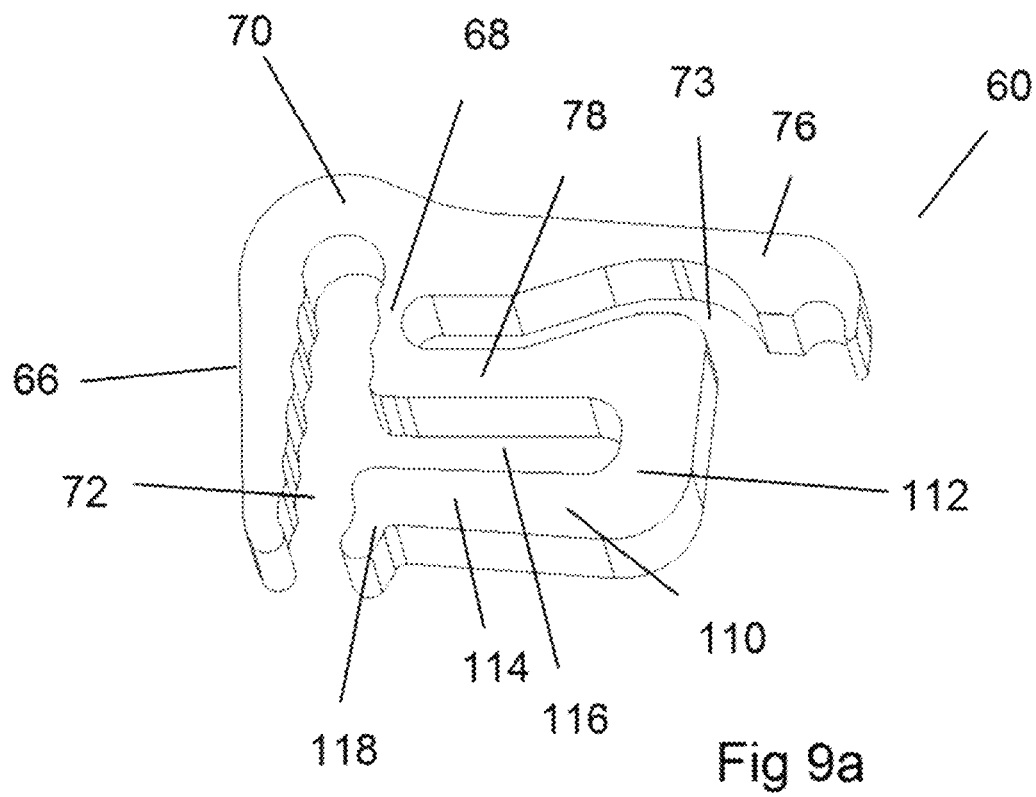
FIG. 9a is a view of a third embodiment of a cable clip in accordance with the present invention.

FIG. 9a shows a further embodiment of a cable clip 60. The cable clip 60 is similar to the cable clip 60 of FIG. 2a and like reference numerals are used to denote like parts. The cable clip 60 includes first, second, third and fourth arms 66, 68, 76 and 78 defining first and second slots 72 and 73. The second arm 68 however is shorter than the first arm 66.

There is provided also a fifth arm 110 extending from the second end of the fourth arm 78. The fifth arm 110 includes a first portion 112 extending transversely to the distal end of the fourth arm 78 away from the third arm 76. The fifth arm 110 includes a second portion 114 extending transversely to the first portion 112 parallel to the fourth arm 78 such that the fourth arm 78 and the fifth arm 110 define a third slot 116 which can be used to receive solar wires that route to the solar panels. In this way, the solar wires are held in position while the ribbon cable is contained within the slot 72. The distal end of the fifth arm 110 includes a foot portion 118. The foot portion 118 extends parallel to the first arm 66 such that an inner surface thereof is collinear with an inner surface of the second arm 68, thereby defining the first slot 72.

Figure 9B:
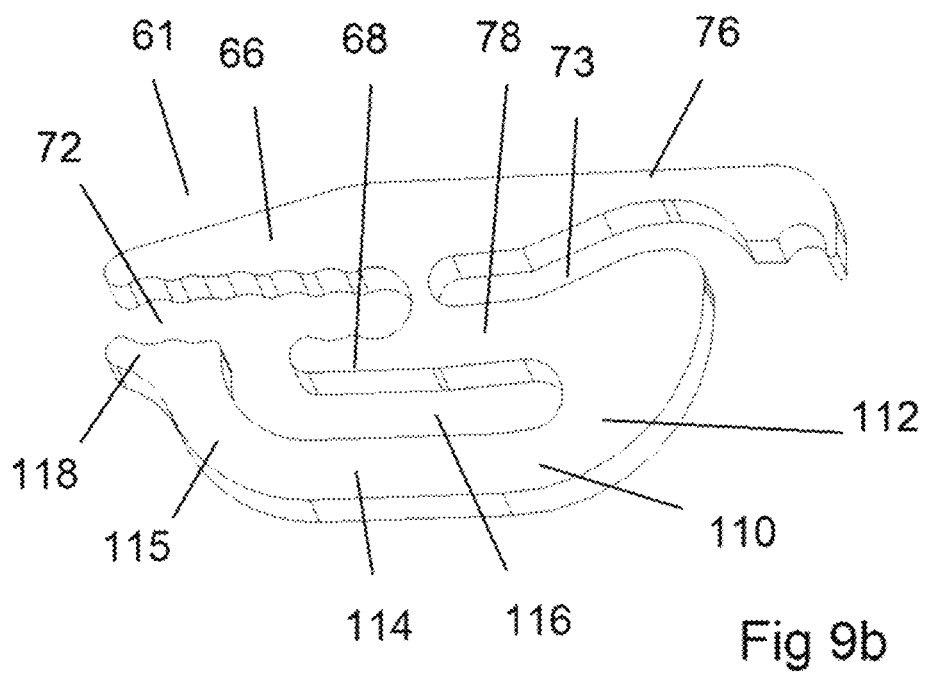
FIG. 9b is a view of a fourth embodiment of a cable clip in accordance with the present invention.

FIG. 9b shows a further embodiment of a cable clip 61. The cable clip 61 is similar to the cable clip 61 of FIG. 2b and like reference numerals are used to denote like parts. The cable clip 60 includes first, second, third and fourth arms 66, 68, 76 and 78 defining first and second slots 72 and 73. The cable clip 61 is also provided with a fifth arm 110. The fifth arm 110 includes a first portion 112 extending transversely to the distal end of the fourth arm 78 away from the third arm 76. The fifth arm 110 includes a second portion 114 extending transversely to the first portion 112 parallel to the second and fourth arms 68 and 78 such that a third slot 116 is defined between the second and fourth arms 68 and 78 and the fifth arm 110.

The fifth arm 110 includes a third portion 115 extending from the end of the second portion 114. The third portion 115 curves back towards the first arm 66 such that the third slot 116 includes a curved neck portion 120 defined by the third portion 115 and the distal end of the second arm 68.

The distal end of the fifth arm 110 includes a foot portion 118. The foot portion 118 extends parallel to the first arm 66 such an inner surface thereof is collinear with an inner surface of the second, arm 68, thereby defining the first slot 72.

The enclosure formed by the bringing together of housing 10 and base 20 is made from non-conductive injection molded plastic providing safety against electricity flow and preventing shock hazards related to metal enclosures. Further, the plastic of the housing 10 is glass filled to provide rigidity, suitable high temperature operation and to prevent heat distortions that can occur in non-glass filled materials. For consistency, the base 20 is also constructed of glass filled material. For these embodiments, flame resistant 20% glass filled polypropylene is used.

As an alternative to the fork lugs and for easier installation, earth and earth sense points are pre-fitted with spade terminals and the fork lugs are replaced with mating crimp spade receptacles The slots 36 in the housing 10 may be strengthened using a Stainless steel (or other metal) insert (not shown). Such an insert could be threaded to accept the fastener 34 and may replace or be ancillary to the nut 39.

Alternatively, the insert could be in the form of a spring with reverse facing teeth so that the slot 36 slides over the frame 13 by the action of the teeth being pushed back and flattened. Once slid over the frame 13 the teeth would grasp the frame 13 preventing the housing 10 from being removed. Removal would still be possible with sufficient force leaving scrape marks in the frame 13.

The spring could be electrically connected to the circuit board. Where earth and/or earth sensing is required, the installer would be instructed to pull back against the housing 10 after sliding over the frame 13 causing the teeth to bite into the frame creating a good electrical contact.

Such teeth could be limited to the base side of the slot 36 enabling the housing 10 to be removed by first sliding a flat piece of metal between the spring teeth and the frame 13, a thin paint scraper could be used for such a purpose.

It will be readily apparent to persons skilled in the relevant arts that various modifications and improvements may be made to the foregoing embodiments, in addition to those already described, without departing from the basic inventive concepts of the present invention.

What is claimed is:

1. A housing comprising:
   a main body including first and second side walls and first and second end walls extending between ends of the first and second side walls;

a plurality of mounting portions, each mounting portion provided adjacent a junction between one of the side walls and one of the end walls such that the mounting portion extends outwardly beyond both of the adjacent side and end walls;

a bore provided in each of the mounting portions, the bore being parallel to the adjacent side and end walls; and a slot provided in each of the mounting portions, the slot extending through an outer surface of the mounting portion into the bore;

wherein an elongate member of a frame is receivable in the slots of two or more of the mounting portions such that fasteners received in the bores of said mounting portions engage with the elongate member to secure the housing to the frame.

2. A housing in accordance with claim 1, wherein the first and second side walls are parallel to each other and the first and second end walls are parallel to each other.

3. A housing in accordance with claim 2, wherein each of the mounting portions comprises a cylindrical body oriented such that a longitudinal axis thereof is parallel to the connection between the adjacent side and end walls.

4. A housing in accordance with claim 3, wherein the first and second side walls and the first and second end walls extend perpendicularly from a base wall to define a chamber into which electronic circuitry may be provided.

5. A housing in accordance with claim 4, wherein each of the first and second side walls and end walls are planar rectangular walls.

6. A housing in accordance with claim 5, wherein the housing includes a cover securable to edges of the first and second side walls and first and second end walls remote from the base wall.

7. A housing in accordance with claim 6, wherein the bore through each of the cylindrical bodies extends from a first end thereof, being adjacent the cover to a second end thereof, being adjacent the base wall.

8. A housing in accordance with claim 7, wherein the slots extend inwardly into the outer surfaces of the cylindrical bodies between the first and second ends thereof such that the slots are perpendicular to the longitudinal axis of the bore.

9. A housing in accordance with claim 8, wherein the fasteners comprise threaded fasteners and one or more openings are provided in the outer surface of the cylindrical bodies adjacent the slot to receive nuts such that rotation of the threaded fasteners causes them to move longitudinally through the bores to engage with the frame received within the slot.

10. A housing in accordance with claim 9, wherein the openings are provided on either side of the slots.

11. A housing in accordance with claim 10, wherein the openings receive connectors for earth and/or earth sense wires such that the connectors are clamped between the nut and the frame.

12. A housing in accordance with claim 11, wherein holes are provided from the chamber of the housing adjacent the mounting portions directly into the openings and earth connection clips are provided extending through the holes, the earth connection clips including a bendable tab connectable to the circuitry within the housing.

13. A housing in accordance with claim 1, wherein an elongate cable port is provided for ribbon cable to exit the housing.

14. A housing in accordance with claim 1, wherein cable connectors are provided on first and second sides of the housing, the cable connectors being connectable to mating cable connectors provided on ribbon cable.

\* \* \* \* \*